(No Model.)

C. H. NEWMAN.
STEAM PACKING.

No. 277,151. Patented May 8, 1883.

WITNESSES
Phil C. Dieterich
W. R. Keyworth

INVENTOR
Chas. H. Newman
by J. H. Alexander
Attorney

UNITED STATES PATENT OFFICE.

CHARLES H. NEWMAN, OF ROCHESTER, NEW YORK.

STEAM-PACKING.

SPECIFICATION forming part of Letters Patent No. 277,151, dated May 8, 1883.

Application filed February 20, 1883. (No model.)

*To all whom it may concern:*

Be it known that I, C. H. NEWMAN, of Rochester, in the county of Monroe and State of New York, have invented certain new and useful Improvements in Steam-Packing; and I do hereby declare that the following is a full, clear, and exact description thereof, reference being had to the accompanying drawings, and to the letters of reference marked thereon, which form part of this specification, in which—

Figure 1:
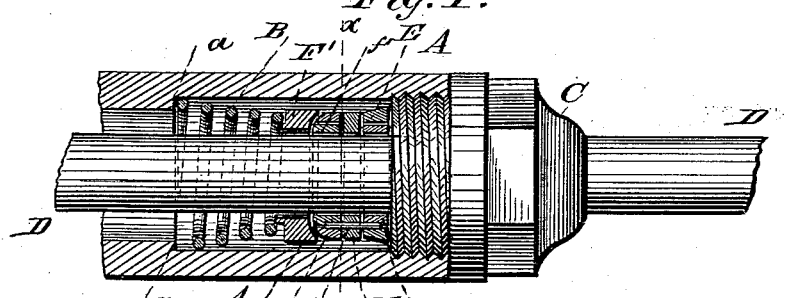
Figure 2:
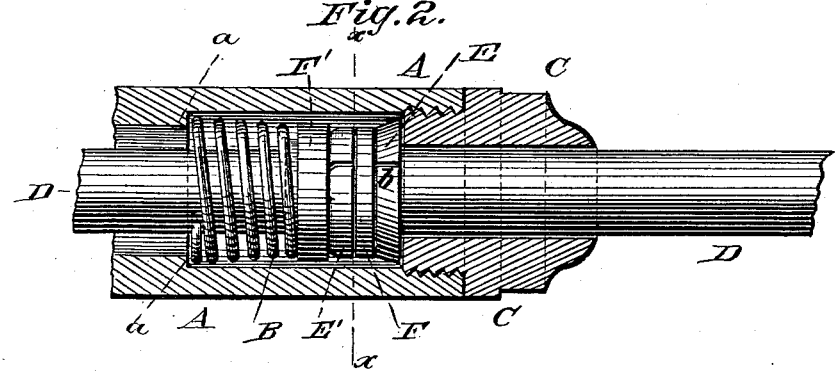
Figure 3:
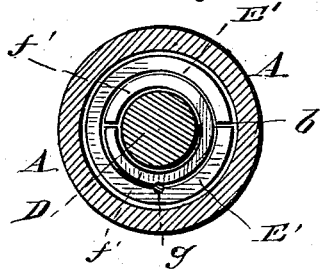

Figure 1 is a diametrical section through the stuffing-box of a steam-cylinder and my improved packing. Fig. 2 is an external view of the packing and a diametrical section through the stuffing-box and its gland. Fig. 3 is a cross-section taken through Figs. 1 and 2 in the plane indicated by dotted lines *x x*.

The object of my invention is to improve metallic steam-packing which is especially designed for the stuffing-boxes of steam machinery; and the nature of it consists in a novel construction and combination of split and solid packing-rings and a coiled spring with a stuffing-box and adjustable gland, as will be fully understood from the following description when taken in connection with the annexed drawings.

A designates a stuffing-box, which is bored out so as to leave a shoulder, *a*, near one end, against which abuts a coiled spring, B. The opposite end of the box A is screw-tapped, and has fitted into it a gland, C, the central bore of which receives a rod, D, which may be the piston-rod or a slide valve rod of a steam-engine cylinder. Inside of the stuffing-box A, and applied on the cylindrical rod D, are a number of rings, as shown in Figs. 1 and 2 of the drawings. The two rings E E' may be made of steel, and the rings F F' may be made of brass. The ring E is the frustum of a cone, the base of which is held in contact with the inner flat end of the gland C. This ring E is split at *b*, and fitted within its cylindrical bore is another split ring, *e*, the split of which breaks joints with the split *b* of the external ring, and is held in its position by means of a dowel-pin, *g*, applied to the solid ring F, which is interposed between the rings E and E'. The solid ring F has flat ends, against which impinge the corresponding ends of the said split rings E E'. The ring E' is a split ring, and has fitted in it another split ring, *f'*, which two rings are prevented from turning on each other by means of the dowel-pin *g*, that passes through the solid ring F, as shown in Fig. 1. The ends of the rings E' *f'* next the coiled spring B are shaped like the segment of a sphere, as indicated by letter *h*, and are fitted into a corresponding socket made in one end of the solid ring F', the bore of which latter is slightly larger in diameter than the diameter of the rod D, so that this ring can freely accommodate itself to the convex surfaces *h* of the rings E' *f'*, like the movements of a ball-and-socket joint. The object of this ball-and-socket adjustment of the ring F' is not only to prevent it from binding, but to take the uneven pressure from the coiled spring B, which holds the rings in place when relieved of steam-pressure, and also in a degree assists the direct steam-pressure.

It is obvious from what I have above described that the split rings will act as an excellent packing for the rod D, and that they are very durable.

Having thus fully described my invention, what I claim as new, and desire to secure by Letters Patent, is—

1. In a metallic steam-packing, the combination, with rod D and box A, of solid ring F', having one of its sides concaved, split ring E', having its adjacent side beveled, the latter resting in the former, solid ring F, split conical ring E, and gland C, all constructed and arranged to operate as and for the purposes set forth.

2. In a metallic steam-packing, the combination, with rod D and box A, of the split conical ring E, its inclosed ring *e*, the solid ring F, dowel-pin *g*, split rings E' *f'*, solid ring F', and a coiled spring, all constructed and adapted to operate substantially as and for the purposes set forth.

In testimony that I claim the foregoing as my own I affix my signature in presence of two witnesses.

CHARLES H. NEWMAN.

Witnesses:
JOHN J. SNELL,
DELOS WENTWORTH.